United States Patent
Bogomolov et al.

(10) Patent No.: US 10,476,975 B2
(45) Date of Patent: Nov. 12, 2019

(54) BUILDING A USER PROFILE DATA REPOSITORY

(71) Applicant: Palantir Technologies Inc., Palo Alto, CA (US)

(72) Inventors: Arseny Bogomolov, Arlington, VA (US); Cooper Bills, Fremont, CA (US); Eric Anderson, Washington, DC (US); Eric Raboin, Vienna, VA (US); John McKinstry Doyle, Washington, DC (US); Lucas Ray, San Francisco, CA (US); Jiawei Marvin Sum, New York, NY (US); Ryan Smith, Vienna, VA (US)

(73) Assignee: Palantir Technologies Inc., Palo Alto, CA (US)

( * ) Notice: Subject to any disclaimer, the term of this patent is extended or adjusted under 35 U.S.C. 154(b) by 326 days.

(21) Appl. No.: 15/372,318

(22) Filed: Dec. 7, 2016

(65) Prior Publication Data

US 2017/0344626 A1 Nov. 30, 2017

Related U.S. Application Data

(63) Continuation-in-part of application No. 15/080,169, filed on Mar. 24, 2016.
(Continued)

(51) Int. Cl.
*H04L 29/08* (2006.01)
*G06Q 10/10* (2012.01)
(Continued)

(52) U.S. Cl.
CPC ............ *H04L 67/22* (2013.01); *G06F 16/337* (2019.01); *G06Q 10/10* (2013.01); *G06Q 50/01* (2013.01); *H04L 67/306* (2013.01); *H04W 4/025* (2013.01)

(58) Field of Classification Search
CPC ......... G06Q 50/01; H04L 67/22; H04L 51/32; H04L 67/306; H04L 12/588; G06F 3/04842; H04N 1/00145
See application file for complete search history.

(56) References Cited

U.S. PATENT DOCUMENTS

| 7,590,647 B2 | 9/2009 | Srinivasan et al. |
| 7,962,495 B2 | 6/2011 | Jain et al. |
| (Continued) | | |

FOREIGN PATENT DOCUMENTS

| EP | 2630588 A2 | 8/2013 |
| EP | 3139328 A1 | 3/2017 |

OTHER PUBLICATIONS

"U.S. Appl. No. 14/923,712, Final Office Action dated Apr. 27, 2017", 16 pgs.
(Continued)

*Primary Examiner* — Hitesh Patel
(74) *Attorney, Agent, or Firm* — Schwegman Lundberg & Woessner, P.A.

(57) ABSTRACT

A computer accesses, from a data repository, profile data of a first entity. The computer determines that a set of information items from the accessed profile data of the first entity are associated with a target activity. The computer determines that the set of information items associated with the target activity includes a subset of information items associated with a second entity. The computer creates or edits, within the data repository, profile data of the second entity based on the subset of information items. The computer provides a digital transmission of at least a portion of the profile data of the second entity.

16 Claims, 9 Drawing Sheets

Related U.S. Application Data

(60) Provisional application No. 62/373,608, filed on Aug. 11, 2016, provisional application No. 62/274,003, filed on Dec. 31, 2015.

(51) Int. Cl.
*G06Q 50/00* (2012.01)
*H04W 4/02* (2018.01)
*G06F 16/335* (2019.01)

(56) References Cited

U.S. PATENT DOCUMENTS

| | | | |
|---|---|---|---|
| 8,438,156 B2 | 5/2013 | Redstone et al. | |
| 8,683,322 B1 | 3/2014 | Cooper | |
| 9,014,726 B1* | 4/2015 | Foster | H04W 4/02 455/418 |
| 9,049,117 B1 | 6/2015 | Nucci et al. | |
| 2011/0202555 A1 | 8/2011 | Cordover et al. | |
| 2012/0123779 A1* | 5/2012 | Pratt | G10L 15/26 704/235 |
| 2012/0290292 A1 | 11/2012 | Iiu et al. | |
| 2013/0218965 A1 | 8/2013 | Abrol et al. | |
| 2014/0086590 A1* | 3/2014 | Ganick | G06Q 30/02 398/118 |
| 2014/0122522 A1* | 5/2014 | Ganapathy | G06Q 10/101 707/769 |
| 2014/0229422 A1 | 8/2014 | Jain et al. | |
| 2015/0039565 A1 | 2/2015 | Lucas | |
| 2015/0128222 A1 | 5/2015 | Festa et al. | |
| 2015/0163258 A1 | 6/2015 | Garcia, III et al. | |
| 2015/0180746 A1 | 6/2015 | Day, II et al. | |
| 2015/0248563 A1 | 9/2015 | Alfarano | |
| 2016/0182716 A1 | 6/2016 | Tatourian et al. | |
| 2016/0371717 A1 | 12/2016 | Black | |
| 2017/0046802 A1* | 2/2017 | Zhang | G06F 16/9535 |
| 2017/0069043 A1 | 3/2017 | Doyle et al. | |
| 2017/0195434 A1 | 7/2017 | Pitelka et al. | |
| 2018/0144440 A1* | 5/2018 | Andrew | G06T 3/40 |
| 2018/0189908 A1 | 7/2018 | Doyle et al. | |

OTHER PUBLICATIONS

"U.S. Appl. No. 14/923,712, Non-Final Office Action dated Feb. 12, 2016", 18 pgs.

"U.S. Appl. No. 14/923,712, Notice of Allowance dated Jan. 23, 2018", 9 pgs.

"U.S. Appl. No. 15/080,169, Final Office Action dated Jan. 9, 2017", 36 pgs.

"U.S. Appl. No. 15/080,169, Final Office Action dated Nov. 14, 2017", 56 pgs.

"U.S. Appl. No. 15/080,169, First Action Interview—Office Action Summary dated Aug. 29, 2016", 28 pgs.

"U.S. Appl. No. 15/080,169, First Action Interview—Pre-Interview Communication dated Jul. 20, 2016", 25 pgs.

"U.S. Appl. No. 15/080,169, Non-Final Office Action dated Jun. 6, 2017", 44 pgs.

"European Application Serial No. 16187091.0, Communication Pursuant to Article 94(3) EPC dated Jun. 25, 2018", 10 pgs.

"European Application Serial No. 16187091.0, Extended European Search Report dated Feb. 3, 2017", 7 pgs.

"European Application Serial No. 16207229.2, Response filed Jan. 4, 2008 to Extended European Search Report dated Feb. 27, 2017", 13 pgs.

"European Application Serial No. 17185555.4, Extended European Search Report dated Oct. 2, 2017", 8 pgs.

"Google Unveils Neural Network with "Superhuman" Ability to Determine the Location of Almost Any Image", MIT Technology Review, [Online]. Retrieved from the Internet: <https://www.technologyreview.com/s/600889/google-unveils-neural-network-with-superhuman-ability-to-determine-the-location-of-almost/>, (Feb. 24, 2016), 6 pgs.

U.S. Appl. No. 16/267,856, filed Feb. 5, 2019, Image Analysis Interface.

* cited by examiner

CLASS OF 2006 — 710

10 ACCOUNTS — 720

| MEMBER ACCOUNTS — 740 | DATE OF UPDATE — 750 | COUNTRY — 760 |
|---|---|---|
| SUEJONES | 9/28/2015 | US, CA |
| KATE_ASHLEY | 9/28/2015 | US |
| BEN1985 | 9/28/2015 | CA |
| TECHFAN06 | 9/28/2015 | GB |
| BILLSMITH | 9/28/2015 | US |
| JOEJOHNSON | 9/28/2015 | US |
| 06STATEGRAD | 9/28/2015 | US |
| JIM_ALLEN | 9/28/2015 | US |
| TRACYJONES | 9/28/2015 | CA |
| ANDYWILLIAMS | 9/28/2015 | GB |

— 730

CANADA
IRELAND
UNITED STATES

— 770

FILTER BY TAG

TOP CONTACTS — 780

| ACCOUNT | CONNECTIONS | | |
|---|---|---|---|
| JOHNSMITH | 6 MENTIONED BY | 39 DIRECT MESSAGES | |
| JEFFSMOM | 9 FOLLOWS | 3 MENTIONS | 6 DIRECT MESSAGES |
| JANEDOE | 14 DIRECT MESSAGES | | |
| BILL_JONES | 11 MENTIONS | 5 DIRECT MESSAGES | |
| SARAH_SMITH | 13 MENTIONS | 3 DIRECT MESSAGES | |

FIG. 7

BUILDING A USER PROFILE DATA REPOSITORY

CROSS REFERENCE TO RELATED APPLICATIONS

This application claims priority to U.S. Provisional Patent Application No. 62/373,608, filed Aug. 11, 2016, and titled "BUILDING A USER PROFILE DATA REPOSITORY," the disclosure of which is expressly incorporated herein by reference in its entirety.

This application claims priority to U.S. Provisional Patent Application No. 62/274,003, filed Dec. 31, 2015, and titled, "COMPUTER-IMPLEMENTED SYSTEMS AND METHODS FOR ANALYZING ELECTRONIC COMMUNICATIONS," the disclosure of which is expressly incorporated herein by reference in its entirety.

This application is a continuation-in-part (CIP) of U.S. patent application Ser. No. 15/080,169, filed Mar. 24, 2016, and entitled "COMPUTER-IMPLEMENTED SYSTEMS AND METHODS FOR ANALYZING ELECTRONIC COMMUNICATIONS," the disclosure of which is expressly incorporated herein by reference in its entirety.

TECHNICAL FIELD

The subject matter disclosed herein relates data access and data storage computer systems. In particular, example embodiments may relate to building a user profile data repository.

BACKGROUND

Individuals, businesses, and other entities rely heavily on the Internet for communication and information access. The Internet provides the ability to access information from a wide variety of resources and to communicate instantaneously with as few or as many people as one likes. While these abilities are very useful to users, users' interactions with one another and their consumption of data are also very interesting to others, such as market analysts. Analysts can learn many things about users based on the nature of their communications and the information they consume and then use this analysis to shape marketing strategies, consumer products, etc.

The Internet provides many different means through which users can communicate with one another, including email, forums, blogs, instant messaging (IM), and social networks. And each of these different means of communication may suit different purposes or allow users to communicate with a different audience. For example, instant messaging is more likely to be used by a user to communicate with one other user or a small group of users, while social networks may be used to communicate with one user (e.g., a direct message), all friends or acquaintances of a user (e.g., a post to a user's private network), or the general public (e.g., a post to a public social network). Moreover, some forms of Internet communication, such as blogs and social networks, allow users to view relationships and communications among other users, such as messages exchanged between users and relationships between users (e.g., friendships, connections, following/followed relationships).

The large volume of data available regarding Internet users' communications and data consumption may be difficult or, in most cases, impossible for analysts to digest. For example, an analyst may have access to information regarding a user's relationships, communications, and interests. In view of the volume of this information and the rate at which the body of this information grows, an analyst would be unable to process that information even with significant expenditure of manual analysis. Therefore, improved systems and methods are desired that provide more efficient visualization, manipulation, and export of data regarding users' Internet communications, while addressing one or more of the above drawbacks and disadvantages.

BRIEF DESCRIPTION OF THE DRAWINGS

Reference will now be made to the accompanying drawings, which illustrate exemplary embodiments of the present disclosure. In the drawings:

FIG. 7 illustrates an example user interface for visualizing information regarding user groups, according to some embodiments.

DETAILED DESCRIPTION

Figure 1:
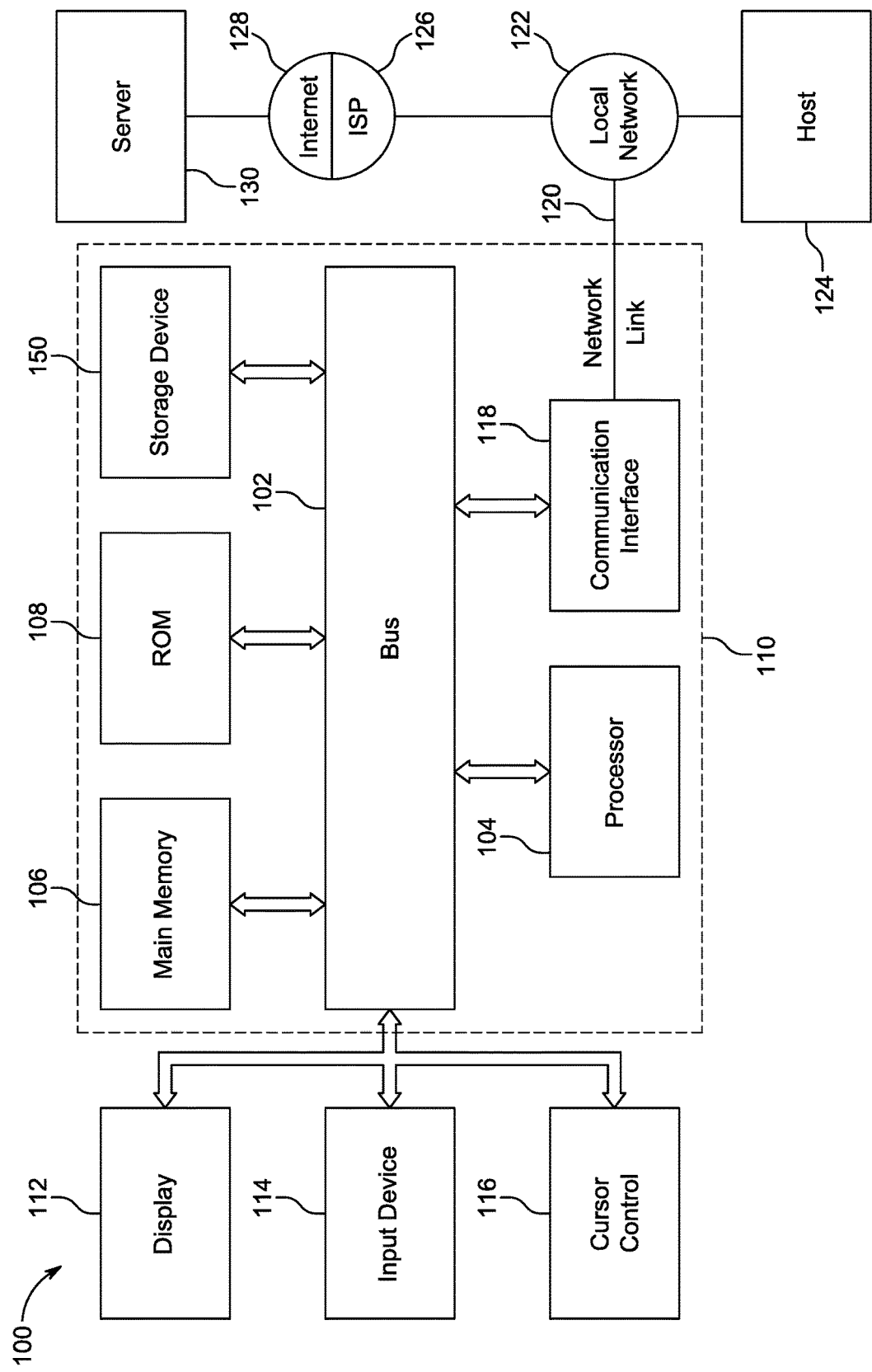
FIG. 1 is a block diagram of an example system for building a user profile data repository, according to some embodiments.

Reference will now be made in detail to several exemplary embodiments of the present disclosure, including those illustrated in the accompanying drawings. Whenever possible, the same reference numbers will be used throughout the drawings to refer to the same or like parts.

Embodiments disclosed herein are directed to, among other things, computer-implemented systems and methods for analyzing electronic communications. The disclosed embodiments provide novel techniques for users to visualize, manipulate, and export data. The disclosed embodiments also provide an integrated solution that is scalable, flexible, and customizable for each user's needs.

In accordance with some embodiments, systems and methods are provided for data management and visualization. With such systems and methods, a user may receive data from one or more sources and manipulate and store the data. In some embodiments, the data may include electronic communications between a primary individual and one or more other individuals. For example, the data may include electronic communications between the primary individual and other individuals on a social network, as well as information describing a primary individuals profile and relationships with other individuals on the social network.

Embodiments of the present disclosure may be implemented to allow analysts to determine one or more locations associated with a primary individual. In one embodiment, a location may be determined based on text, images, or metadata (e.g., IP address or timestamp) associated with an electronic communication. In another embodiment, a location may be determined based on data associated with other individuals in the primary individual's social network. Moreover, embodiments of the present disclosure may be implemented to identify and describe relationships among individuals. For example, in one embodiment, a primary individual's top contacts may be identified and the relationship between the primary individual and each of the top contacts may be described. Information regarding the locations associated with a primary individual, the other individuals associated with the primary individual, and the primary individual's electronic communications may be presented in a user interface to allow an analyst efficiently to consume, manipulate, and export the data.

In some embodiments, systems and methods are provided that receive, from over an electronic network, a plurality of communications associated with a primary individual. The systems and methods also determine, based on analysis of the plurality of communications, at least one location associated with the primary individual. In addition, the systems and methods identify other individuals associated with the primary individual and retrieve, from one or more databases, information relating to the other individuals. Furthermore, the systems and methods generate a graphical user interface including panels for presenting the at least one determined location, information relating to the identified other individuals, and at least one of the received plurality of communications.

As will be appreciated from the present disclosure, the exemplary systems and methods described herein may be implemented to analyze electronic communications, including, for example, electronic communications transmitted via a social network. Such an analysis may be done for a variety of purposes. In one embodiment, communications and other data may be analyzed, manipulated, and visualized for purposes of market analysis. Of course, the embodiments of the present disclosure are not limited to this exemplary implementation, and can be implemented and used for a wide variety of purposes.

According to some embodiments, the operations, techniques, and/or components described herein can be tangibly implemented by a system, which can include one or more special-purpose computing devices. The special-purpose computing devices can be hard-wired to perform the operations, techniques, and/or components described herein, or can include digital computing devices such as one or more application-specific integrated circuits (ASICs) or field programmable gate arrays (FPGAs) that are persistently programmed to perform the operations, techniques and/or components described herein, or can include one or more hardware processors programmed to perform such features of the present disclosure pursuant to program instructions in firmware, memory, other storage, or a combination. Such special-purpose computing devices can also combine custom hard-wired logic, ASICs, or FPGAs with custom programming to accomplish the technique and other features of the present disclosure. The special-purpose computing devices can be desktop computer systems, portable computer systems, handheld devices, networking devices, or any other device that incorporates hard-wired and/or program logic to implement the techniques and other features of the present disclosure.

The one or more special-purpose computing devices can be generally controlled and coordinated by operating system software, such as iOS, Android, Blackberry, Chrome OS, Windows XP, Windows Vista, Windows 7, Windows 8, Windows Server, Windows CE, Unix, Linux, SunOS, Solaris, VxWorks, or other compatible operating systems. In other embodiments, the computing device can be controlled by a proprietary operating system. Operating systems control and schedule computer processes for execution, perform memory management, provide file system, networking, I/O services, and provide a user interface functionality, such as a graphical user interface ("GUI"), among other things.

By way of example, FIG. 1 is a block diagram that illustrates an implementation of an exemplary system 100, which, as described above, can comprise one or more special-purpose computing devices. As will be appreciated from this disclosure, the exemplary embodiment of FIG. 1 is provided for purposes of illustration. The number and arrangement of components in system 100 may be modified or adjusted without departing from the teachings of the present disclosure.

As illustrated in FIG. 1, system 100 includes a computing device 110 that includes a bus 102 or other communication mechanism for communicating information, and one or more hardware processors 104, coupled with bus 102 for processing information. The one or more hardware processors 104 can be, for example, one or more microprocessors.

Computing device 110 also includes a main memory 106, such as a random access memory (RAM) or other dynamic storage device, coupled to bus 102 for storing information and instructions to be executed by processor 104. Main memory 106 also can be used for storing temporary variables or other intermediate information during execution of instructions to be executed by processor 104. Such instructions, when stored in non-transitory storage media accessible to one or more processors 104, render computing device 110 into a special-purpose machine that is customized to perform the operations specified in the instructions.

Computing device 110 further includes a read only memory (ROM) 108 or other static storage device coupled to bus 102 for storing static information and instructions for processor 104. A storage device 150, such as a magnetic disk, optical disk, or USB thumb drive (Flash drive), etc., is provided and coupled to bus 102 for storing information and instructions.

Computing device 110 can be coupled via bus 102 to a display 112, such as a cathode ray tube (CRT), an LCD display, or a touchscreen, for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. The input device typically has two degrees of freedom in two axes, a first axis (for example, x) and a second axis (for example, y), that allows the device to specify positions in a plane. In some embodiments, the same direction information and command selections as cursor control may be implemented via receiving touches on a touch screen without a cursor.

Computing device 110 can include a user interface module to implement a GUI that may be stored in a mass storage device as executable software codes that are executed by the one or more computing devices. This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C, and C++. A software module can be compiled and linked into an executable program, installed in a dynamic link library, or written in an interpreted programming language such as, for example, BASIC, Perl, Python, or Pig. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that may be combined with other modules or divided into sub-modules despite their physical organization or storage.

Computing device 110 can implement the techniques and other features described herein using customized hard-wired logic, one or more ASICs or FPGAs, firmware and/or program logic which in combination with the computing device causes or programs computing device 110 to be a special-purpose machine. According to some embodiments, the techniques and other features described herein are performed by computing device 110 in response to one or more processors 104 executing one or more sequences of one or more instructions contained in main memory 106. Such instructions can be read into main memory 106 from another storage medium, such as storage device 150. Execution of the sequences of instructions contained in main memory 106 causes processor 104 to perform the process operations described herein. In alternative embodiments, hard-wired circuitry can be used in place of or in combination with software instructions.

The term "non-transitory media" as used herein refers to any media storing data and/or instructions that cause a machine to operate in a specific fashion. Such non-transitory media can comprise non-volatile media and/or volatile media. Non-volatile media includes, for example, optical or magnetic disks, such as storage device 150. Volatile media includes dynamic memory, such as main memory 106. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from, but can be used in conjunction with, transmission media. Transmission media participates in transferring information between storage media. For example, transmission media includes coaxial cables, copper wire and fiber optics, including the wires that comprise bus 102. Transmission media can also take the form of acoustic or light waves, such as those generated during radio-wave and infra-red data communications.

Various forms of media can be involved in carrying one or more sequences of one or more instructions to processor 104 for execution. For example, the instructions can initially be carried on a magnetic disk or solid state drive of a remote computer. The remote computer can load the instructions into its dynamic memory and send the instructions over a telephone line using a modem. A modem local to computing device 110 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 can optionally be stored on storage device 150 either before or after execution by processor 104.

Computing device 110 also includes a communication interface 118 coupled to bus 102. Communication interface 118 provides a two-way data communication coupling to a network link 120 that is connected to a local network 122. For example, communication interface 118 can be an integrated services digital network (ISDN) card, cable modem, satellite modem, or a modem to provide a data communication connection to a corresponding type of telephone line. As another example, communication interface 118 can be a local area network (LAN) card to provide a data communication connection to a compatible LAN. Wireless links can also be implemented. In any such implementation, communication interface 118 sends and receives electrical, electromagnetic or optical signals that carry digital data streams representing various types of information.

Network link 120 typically provides data communication through one or more networks to other data devices. For example, network link 120 can provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computing device 110, are example forms of transmission media.

Computing device 110 can send messages and receive data, including program code, through the network(s), network link 120 and communication interface 118. In the Internet example, a server 130 might transmit a requested code for an application program through Internet 128, ISP 126, local network 122 and communication interface 118. The received code can be executed by processor 104 as it is received, and/or stored in storage device 150, or other non-volatile storage for later execution. In addition, computing device 110 may receive data from a plurality sources using network link 120 and communication interface 118. The data sources may include personal and corporate databases, as well as professional or commercial data sources. Such data may be transmitted via the Internet or other network(s) and stored locally at computing device 110, or may be hosted remotely (e.g., in a cloud arrangement) and accessed as needed by computing device 110 to perform the methods, techniques, and other features of the present disclosure.

Figure 2:
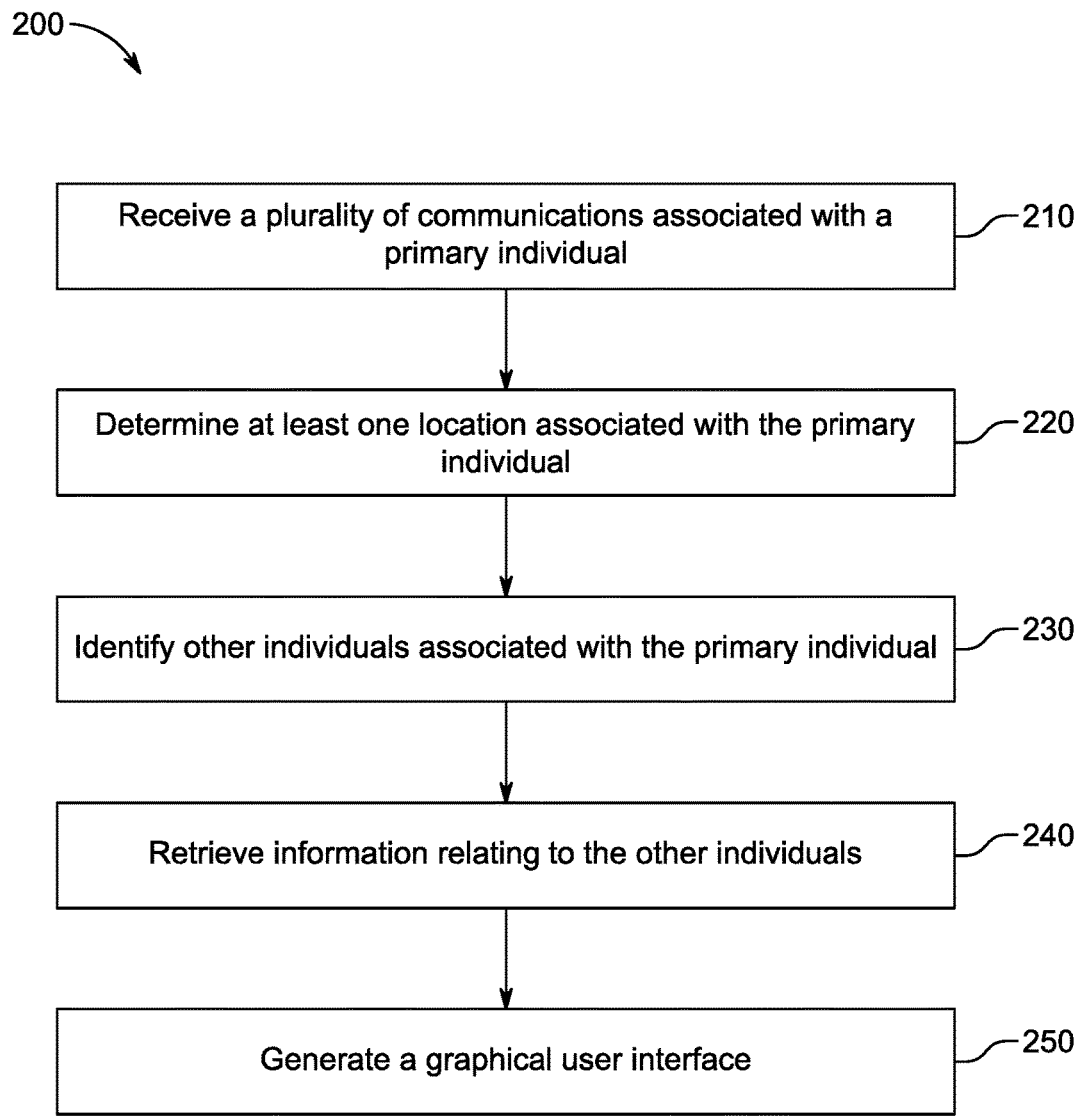
FIG. 2 is a flowchart of an example method for analyzing electronic communications, according to some embodiments.

FIG. 2 shows a flowchart representing an exemplary method 200 for analyzing electronic communications, consistent with embodiments of the present disclosure. In some embodiments, method 200 can be performed by a client application (e.g., a web browser, a plug-in to a web browser, a standalone executable application, etc.) running on a client device, by a server (e.g., a web server), or it can have some operations or parts thereof executed on the client device, and some operations or parts thereof executed on the server. Thus, method 200 can be performed with, for example, system 100 including one or more computing devices 110, as described above with reference to FIG. 1. Further, while method 200 and other embodiments described herein can be performed by multiple computing devices, each having one or more processors, for purposes of illustration and without limitation, method 200 and other features will be explained herein with respect to a single computing device (e.g., computing device 110). Moreover, while the flowchart discloses the following operations in a particular order, it is appreciated that at least some of the operations can be moved, modified, or deleted where appropriate, consistent with the teachings of the present disclosure.

Referring to FIG. 2, at operation 210, the computing device receives, from over an electronic network, a plurality of communications associated with a primary individual. The received plurality of communications may be stored in a database or other memory associated with the computing device. In one embodiment, an analyst may access the plurality of communications by clicking on a link associated with one or more files containing the plurality of communications. In another embodiment, an analyst may access the plurality of communications associated with the user by providing login information, such as a user name and password. Upon clicking the link, providing the login information, or otherwise requesting the plurality of communications associated with the primary individual, the computing device may download the plurality of communications. For example, the computing device may download the plurality of communications from a database or server located remotely over a network, such as the Internet.

In disclosed embodiments, the plurality of communications may be associated with a social network. For example, the plurality of communications may be communications associated with one or more user accounts on Facebook, Twitter, Instagram, or any other social network. The communications may include any communications available to users of the social network, such as direct, instant, or private messages, posts, tweets, notes, likes, pokes, etc. In another embodiment, the plurality of communications may include emails, blog posts, forum posts, phone calls, text messages, encrypted messages, or any other form of electronic communication. Moreover, the communications may be obtained from publicly available sources, such as a user's public social media account or blog. Alternatively, the communications may be obtained through other means, such as via legal process (e.g., a subpoena).

In disclosed embodiments, the computing device may assign a score to each of the plurality of communications associated with the primary individual. For example, an analyst may use the computing device to assign a score to a communication. Alternatively, the computing device may employ one or more algorithms to determine a score for a communication and assign the score to the communication. In one embodiment, the score may be a number that indicates how well the communication fits within a specified category. In one embodiment, the computing device may determine a composite score for a primary individual based on the scores assigned to the plurality of communications associated with the primary individual. The composite score may be assigned to the primary individual.

In disclosed embodiments, the computing device may receive, from over an electronic network, relationship data associated with a primary individual. For example, the computing device may receive information identifying other individuals who follow the primary individual, other individuals followed by the primary individual, others individuals with whom the primary individual is friends, interested in, or likes, and other individuals who are in one or more groups with the primary individual. According to certain embodiments, the relationship data may be included in the received plurality of communications associated with the primary individual. Alternatively, the relationship data may be received separately from the plurality of communications associated with the primary individual. The received relationship data may be stored in a database or other memory associated with the computing device.

In disclosed embodiments, characteristics of a social network may be defined in a dictionary. For example, a dictionary may define one or more communications and relationships that may be facilitated by the social network. As an example, a dictionary for Facebook may define "friend" as a reciprocal relationship and "follower" as a one-way relationship. The dictionary for Facebook may also define "post" as a public communication and "message" as a private communication. Further, the dictionary for Facebook may include definitions for "tag," "like," "poke," etc. As another example, a dictionary for Twitter may define "follower" and "followed by" as one-way relationships, "tweet" as a public communication, and "direct message" as a private communication. A dictionary for Twitter may also include definitions for "retweet," "mention," "hashtag," etc. In one embodiment, these and other characteristics of a social network may be defined in a configuration file. The computing device may access this dictionary or configuration file to determine how to store and understand the communications and other data that are associated with a user account on a social network. By using a dictionary to define these parameters, the computing device is able to understand and incorporate data from new social networks, as well as to update the manner in which it stores and interprets data from existing social networks.

At operation 220, the computing device determines, based on analysis of the plurality of communications, at least one location associated with the primary individual. In one embodiment, the computing device determines at least one location of the primary individual by analyzing the content of at least one communication, such as the text, images, or other data that is seen by the author and recipient of the communication. For example, the computing device can determine at least one location of the primary individual by identifying a location name in the content of at least one of the received plurality of communications. The location name may include, for example, a street address, city, county, state, region, country, continent, coordinates (e.g., latitude/longitude coordinates), monument, landmark, or airport code. In one embodiment, the computing device may analyze a plurality of communications associated with the primary individual to identify one or more locations that are mentioned in the content of the communications most frequently. Moreover, the computing device may associate a location mentioned in a communication with that communication and separately associate one or more locations mentioned in the primary individual's communications with the primary individual. This may allow an analyst to understand how the primary individual's location changes over time (e.g., by providing an automated output tracking and graphically representing this information).

The computing device can also determine at least one location of the primary individual by extracting an image from the received plurality of communications and identifying a location associated with the extracted image. For example, an individual may send or receive a communication that includes an image, which may be accompanied by a caption or other text describing the image or a geotag that identifies where the image was captured. If the image is accompanied by text or a geotag that specifies a location associated with the image, the computing device may associated the specified location with the communication and the individual. The computing device may also analyze the image to determine where the image was captured. For example, the computing device may use an image recognition program to determine what the image represents and access a database or other storage that associates the content of the image with a location to determine a location associated with the image.

In one embodiment, the computing device determines at least one location associated with the primary individual by analyzing metadata associated with at least one of the received plurality of communications. For example, the computing device can determine at least one location associated with the primary individual by analyzing an Internet protocol (IP) address associated with at least one of the received plurality of communications. Each communication received by the computing device may include metadata identifying the IP address of the sending device and the IP address of the receiving device. The computing device may determine whether the primary individual is the sender or the recipient, determine a location associated with the primary individual's IP address, and associate the determined location with the communication and the primary individual. The computing device may also identify the Internet service provider (ISP) associated with each IP address and determine and store a location associated with the ISP.

The computing device can also determine at least one location associated with the primary individual by analyzing timestamps associated with the received plurality of communications. In one embodiment, the computing device may determine how communications were sent or received by the primary individual on average for each hour of the day. A period of time where the primary individual exchanges very few communications may correspond to a period when the primary individual is sleeping. For example, if the number of communications sent by an individual drops significantly at one point and rises significantly eight hours later, the point at which the number of communications drops my indicate the time that the individual goes to sleep and the point at which the number of communications increases may indicate the time that the individual wakes. In one embodiment, a four-hour period of least communications activity may be predicted to correspond to 1:00 AM to 5:00 AM local time.

In this embodiment, the difference between the start of that four-hour window and 1:00 AM may be determined and used to determine a predicted time zone of the individual. The predicted time zone of the individual may determine the individual's residence or narrow the potential residences of the individual to a smaller set. Accordingly, the computing device can identify a time period of low activity based on the analysis of the timestamps and determine a potential time zone of the primary individual based on the identified time period.

In another embodiment, the computing device determines at least one location associated with the primary individual by analyzing data associated with at least one other individual who is associated with the primary individual. For example, the computing device may determine at least one location associated with the primary individual based on one or more locations associated with the primary individual's top contacts. Alternatively, the computing device may determine which locations are associated with the highest number of the primary individual's contacts (across all contacts of the primary individual) and predict the location of the primary individual based on that determination.

According to some embodiments, the computing device determines at least one location associated with the primary individual based on a combination of the above methods. For example, the computing device may determine several potential locations where the primary individual may reside based on locations known to be associated with the primary individual's contacts and, from this subset of locations, determine a most likely location based on a predicted time zone of the primary individual.

At operation 230, the computing device identifies other individuals associated with the primary individual. In one embodiment, other individuals associated with the primary individual may be determined based on the received plurality of communications associated with the primary individual. For example, the computing device may designate each other individual with whom the primary individual communicates as associated with the primary individual. In another embodiment, other individuals associated with the primary individual may be determined based on relationship data received for the primary individual. For example, the computing device may designate each other individual with whom the primary individual is friends, follows, or is followed by as associated with the primary individual. In still another embodiment, the computing device may designate another individual as associated with the primary individual if the number of mutual friends or contacts of the two individuals exceeds a threshold value.

In one embodiment, the computing device may receive a plurality of communications associated with the identified other individuals. The computing device may assign a score to each of the plurality of communications associated with each of the identified other individuals. For example, an analyst may use the computing device to manually assign a score to a communication. Alternatively, the computing device may automatically assign a score to a communication based on one or more algorithms. Moreover, the computing device may determine a total score for each of the identified other individuals based on the scores of each communication associated with the individual. In one embodiment, the computing device may determine a composite score for a primary individual based on the scores assigned to the plurality of communications associated with the primary individual and a score (e.g., total score) associated with at least one of the identified other individuals. The composite score may be assigned to the primary individual.

In one embodiment, the identified other individuals associated with the primary individual may be ranked. For example, the strength of the association between the primary individual and each other individual may be scored. In one embodiment, the score for an association between a primary individual and another individual may be based on the quantity and type of communications between the two individuals. For example, direct communications (e.g., direct or instant messages) between the primary individual and another individual may be weighted higher than posts (e.g., public tweets or posts to a Facebook timeline) and, thus, more significantly increase the score of the strength of the association between the two individuals. Moreover, each type of communication involving two individuals, such as a direct communication, public post, mention, or picture tag, may be associated with a different weight.

The score for an association between a primary individual and another individual may also be based on the type of relationship between the two individuals. In one embodiment, a mutual relationship (e.g., friendship on Facebook or reciprocal follow relationship on Twitter or Instagram) may be weighted more heavily than a one-way relationship (e.g., a one-way follow or followed-by relationship on Facebook, Twitter, or Instagram). In another embodiment, the number of mutual contacts (e.g., friends, followers) between two individuals may also be used to determine the score for an association between those two individuals. The computing device may rank each of the other individuals associated with the individual according to the scores.

At operation 240, the computing device retrieves, from one or more databases, information relating to the other individuals. In one embodiment, the computing device retrieves the information relating to the other individuals from one or more databases over a network. Alternatively, the computing device may retrieve the information relating to the other individuals from local storage, such as a local database or other memory. In one embodiment, the information relating to the other individuals comprises information relating to communications associated with the other individuals. In another embodiment, the information relating to the other individuals comprises information relating to relationships of the other individuals.

At operation 250, the computing device generates a graphical user interface including panels for presenting the at least one determined location, information relating to the identified other individuals, and at least one of the received plurality of communications. In one embodiment, a panel may be an area of a user interface configured to provide information to a user. In some instances, a panel could be dedicated to the presentation of a certain type of information. Accordingly, in one embodiment, the generated user interface may comprise three panels: one for presenting the at least one determined location, one for presenting information relating to the identified other individuals, and one for presenting at least one of the received plurality of communications. In another embodiment, the at least one determined location, information relating to the identified other individuals, and at least one of the received plurality of communications may be displayed in the same panel. Moreover, additional information could be displayed along with this information in one or more of the panels or additional panels may be added to the user interface to display additional information.

According to certain embodiments, at least one determined location is presented using a map. For example, the computing device may generate a panel including a map with icons or other graphics identifying one or more locations associated with the primary individual on the map. Alternatively, information regarding the at least one determined location may be presented in a list or table format, which may include the location identifier (e.g., street address, city, country, latitude/longitude coordinates), the dates and times at which the primary individual was at the location, and communications associated with the primary individual's presence at the location. In one embodiment, this information may be presented in response to a user selection of a location on a map, table, or list.

In some embodiments, information relating to the identified other individuals is presented in a table or list format. For example, the user interface may include a panel that displays all or a subset of users. In one embodiment, the panel displays the primary individuals's top contacts (i.e., those other individuals with the strongest association with the primary individual). The panel may display the name associated with each individual, as well as information describing the relationship and communications between the individuals. For example, the panel may indicate whether the other individual is a friend or follower of the primary individual, how they communicate (e.g., by public or private communication), and how frequently they communicate (e.g., number of messages per day or week).

In some embodiments, at least one of the received plurality of communications is presented in table or list format. For example, the computing device can display all or a subset of communications transmitted to or from the primary individual. In addition to the content or text of each communication, the computing device can display metadata associated with the communication, such as the timestamp, sending IP address, and receiving IP address associated with the communication.

In some embodiments, the computing device filters at least one communication presented in the graphical user interface based on at least one of date, communication type, mentioned user, tag, and score. The generated graphical user interface may include input fields (e.g., text box, checkbox, radio button, drop-down list) for identifying a date, communication type, mentioned user, or tag. For example, the generated graphical user interface may include input fields for identifying a date or date range. The generated graphical user interface may also include an input field, such as a drop-down list, for identifying a communication type, such as direct message, tweet, or post. Further the generated graphical user interface may include an input field for identifying a mentioned user (i.e., a user name appearing in a communication). Moreover, the generated graphical user interface may include an input field for identifying a tag, such as a hashtag. The generated graphical user interface may also include an input field for filtering communications by score, such that only those communications whose score exceeds a specified threshold are presented in the graphical user interface. Alternatively, the plurality of communications may be sorted by score, such that, for example, the communication with the highest score is presented first in the graphical user interface and the communication with the lowest score is presented last. The computing device may filter the at least one communication to present only communications that meet the criteria set forth in these fields.

According to certain embodiments, the computing device identifies at least two related accounts associated with the primary individual. For example, one individual may have more than one user account on the same social network or multiple user accounts across different social networks (e.g., a Facebook account and a Twitter account). Accordingly, the computing device can identify at least two related accounts associated with the primary individual by analyzing communications associated with a plurality of user accounts for similarities and designating at least two user accounts as related based on the similarities. In some embodiments, the computing device identifies at least two related accounts on the same social network that are associated with the same individual. For example, the computing device may parse communications transmitted by multiple user accounts and compare the communications to identify common words, languages, and translations used, places or people (e.g., user accounts or names) mentioned, etc. The computing device may also compare the relationships associated with two or more user accounts to determine whether the user accounts likely belong to the same individual. For example, the computing device may compare the list of accounts followed, followers, and friends to determine if two or more user accounts have relationships with a significant proportion of the same other user accounts. The computing device can also combine analysis of communications and relationships to determine whether two or more user accounts likely belong to the same individual.

The computing device may compare user accounts across social networks to determine whether a user account on one social network is likely associated with the same individual as a user account of another social network. For example, the computing device may parse communications transmitted by user accounts from different social networks and compare the communications to identify common words, languages, and translations used, places or people mentioned, etc. The computing device may also compare profile data, such as name, birthdate or age, residence, and school attended, to determine whether user accounts associated with different social networks are likely to be identified with the same individual.

The computing device may determine a score for the similarities between two user accounts and compares this score to a threshold to determine whether the user accounts likely correspond to the same individual. If the score exceeds the threshold, the computing device may link the accounts, such that an analyst may view information corresponding to the related accounts together. For example, information (e.g., locations, top contacts, and communications) associated with the two user accounts may be displayed together in the same panel, window, or interface.

The computing device may export data associated with the primary individual. For example, the computing device may export information relating to at least one determined location, information relating to the identified other individuals, and at least one of the received plurality of communications to a file. In one embodiment, an analyst may select one or more data elements to redact from the exported information. For example, an analyst may select or highlight portions of the data displayed on the generated graphical user interface for redaction using a redaction tool. In one embodiment, the computing device may export the redacted or unredacted information to a file in a format specified by a user, which may include, for example, a spreadsheet (e.g., XSL), word processing document (e.g., DOCX), portable document format (PDF), or hypertext markup language (HTML).

The computing device may receive, through the generated graphical user interface, information to associate with a primary individual and store the information along with the other information (e.g., location information, contacts, communications, relationships). For example, the generated graphical user interface may include a comment box that enables an analyst to input comments regarding the primary individual. The generated graphical user interface may also allow the analyst to associate one or more tags or categories with the primary individual, add the primary individual to one or more groups, and associate the primary individual with one or more locations. For example, an analyst may review information presented in the generated graphical user interface and determine information (e.g., location information) that may not be automatically detected by the computing device and input this information for storage along with the other information. In one embodiment, the computing device may receive location information associated with a primary individual via an analyst using the generated graphical user interface to drop a pin on a location on a map. Further, the analyst may associate the location with one or more communications associated with the primary individual and a degree of specificity or confidence related to the location. For example, the analyst may specify that the location is accurate to the latitude and longitude coordinates, street address, city, or country specified, or the analyst may identify a radius around the dropped pin in which the primary individual is likely to have been located.

Figure 3:
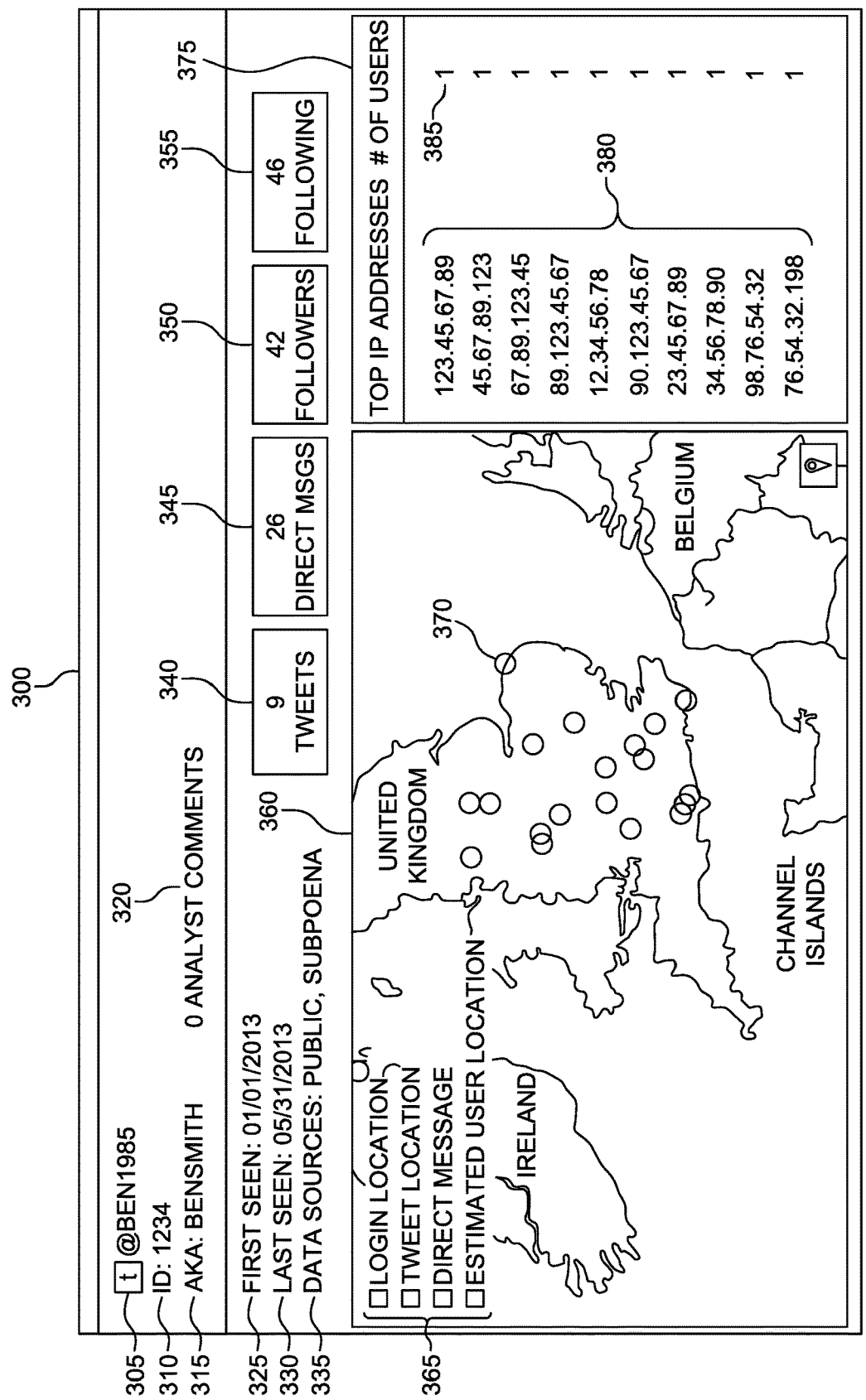
FIG. 3 illustrates an example user interface for visualizing and manipulating location data and other data, according to some embodiments.

FIG. 3 illustrates an exemplary user interface 300, consistent with an embodiment of the present disclosure. User interface 300 illustrates an example of a display generated by the computing device (e.g., computing device 110) that can be implemented on device (e.g., display 112) for viewing by a user. Interface 300 can assist the user to visualize and manipulate location data and other data associated with a primary individual. In the exemplary embodiment of FIG. 3, interface 300 includes user name 305, unique identifier 310, aliases 315, comments 320, date first seen 325, date last seen 330, data sources 335, tweet count 340, direct message count 345, follower count 350, following count 355, map 360, map legend 365, location 370, IP address table 375, IP address 380, and IP address use count 385. Each of these graphical elements is described in greater detail below. It will be understood from this disclosure that the number and arrangement of these elements is exemplary and that modifications can be made, consistent with the present disclosure.

User name 305 may display a user name associated with a primary individual. For example, user name 305 may display a user name associated with a Twitter, Facebook, or Instagram account of a primary individual. User name 305 and other information displaced in interface 300 may include information from other social networks as well, as would be understood by one of ordinary skill in the art. Unique identifier 310 may display a unique number associated with the displayed user name. In one embodiment, the computing device may associate the information displayed in interfaces 300, 400, 500, and 600 with unique identifier 310, so that the information associated with a user account has a unique key (e.g., for database storage). In one embodiment, unique identifier 310 may correspond to one individual and a plurality of accounts associated with the same individual. Alternatively, each user account, whether associated with unique or non-unique individuals, may be associated with a different unique identifier. Alias 315 may list any aliases associated with the user account. For example, alias 315 may list other user accounts that are known to be associated with the same individual. In one embodiment, related user accounts may be linked such that an analyst may click on the user account name to navigate to an interface that displays information regarding the related user account. Alias 315 may also display a list of names or identifiers by which the individual associated with the user account may be referenced. Comments 320 identifies the number of analyst comments that have been associated with the user account. In one embodiment, comments 320 is a selectable button or link that an analyst may select in order to open an interface for submitting a comment to associate with the user account.

Components 340-355 may be used to display summary information regarding an individual's (or user account's) communications and relationships with other individuals (or user accounts). In the exemplary embodiment shown in FIG. 3, components 340-355 describe communications and relationships associated with a Twitter account. In particular, tweet count 340 displays the number of tweets sent by the primary individual and direct message count 345 displays the number of direct messages sent by the primary individual. Moreover, follower count 350 displays the number of other individuals who follow the primary individual, and following count 355 displays the number of other individuals that the primary individual follows. One of ordinary skill would understand that components 340-355 may be adapted to display information regarding communications and relationships associated with other social networks, such as Instagram posts, direct messages, followers, and users followed and Facebook posts, messages, friends, followers, and individuals followed.

Map 360 may display one or more locations 370 associated with a primary individual. Map legend 365 may display a legend for the displayed locations 370. In the exemplary embodiment shown in FIG. 3, map legend 365 displays information identifying how locations associated with a login, tweet, direct message, or estimated user location are represented on map 360, such as by color. In one embodiment, each of the displayed communication types may be associated with a check box, which may allow an analyst to select and which communication types the analyst wishes to be displayed on map 360. Accordingly, the computing device can filter the displayed locations 370 based on communication type. Moreover, IP address table 375 may display one or more IP addresses 380 associated with the communications displayed in map 360, along with an IP address use count 385 associated with each IP address 380.

Figure 4:
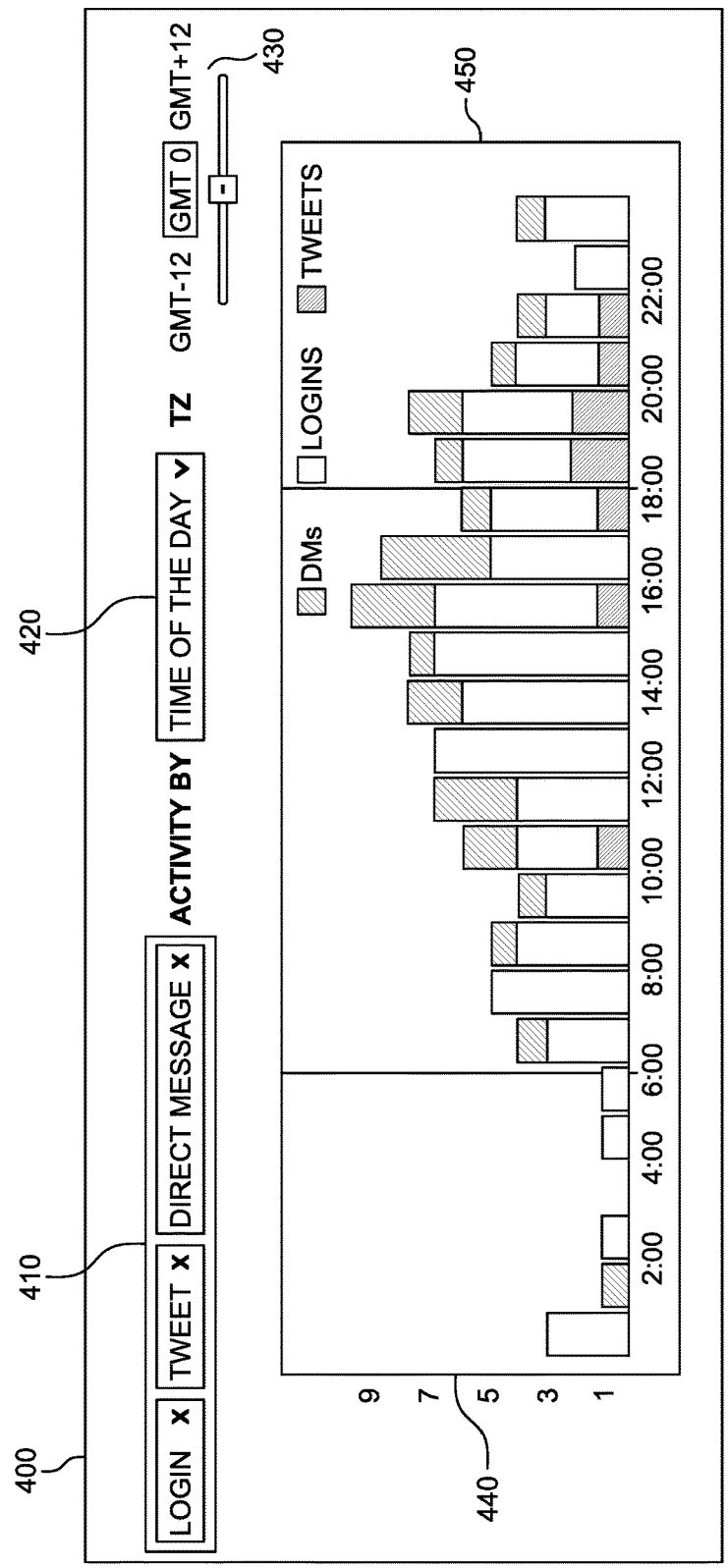
FIG. 4 illustrates a first example user interface for visualizing communications activity, according to some embodiments.

FIG. 4 illustrates an exemplary user interface 400, consistent with an embodiment of the present disclosure. User interface 400 illustrates an example of a display generated by the computing device (e.g., computing device 110) that can be implemented on device (e.g., display 112) for viewing by a user. Interface 400 can assist the user to visualize communications activity associated with a primary individual. In the exemplary embodiment of FIG. 4, interface 400 includes message type selector 410, scope selector 420, time zone slider 430, chart 440, and chart legend 450. Each of these graphical elements is described in greater detail below. It will be understood from this disclosure that the number and arrangement of these elements is exemplary and that modifications can be made, consistent with the present disclosure.

Message type selector 410 may enable an analyst to select the types of messages for which data should be represented in chart 440. Scope selector 420 may enable an analyst to select the scope of the information displayed in chart 440. For example, scope selector 420 may be used to cause the computing device to organize information in chart 440 by time of day, day of week, or month of year. In the exemplary embodiment shown in FIG. 4, the information displayed in chart 440 is displayed based on time of day, as reflected in the exemplary scope selector 420 shown in FIG. 4. Time zone slider 430 may enable an analyst to adjust the time zone associated with a primary individual, which may adjust the local time for the information displayed in chart 440. Chart 440 displays information regarding the number of communications sent or received by a primary individual according to communication type (e.g., direct message, login, and tweet) and period (e.g., hour). Chart legend 450 displays information enabling the user to understand how data regarding the different communication types is represented in chart 440.

Figure 5:
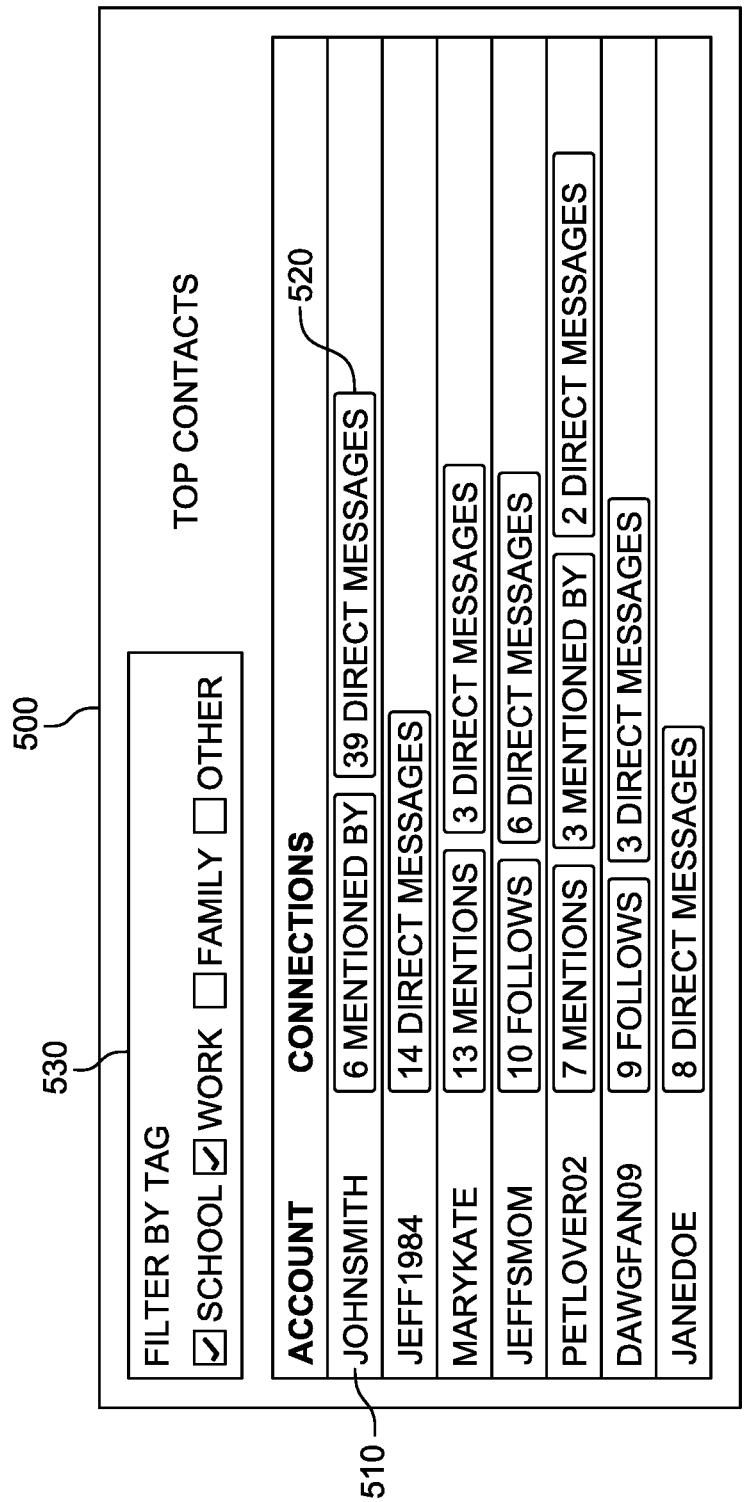
FIG. 5 illustrates a second example user interface for visualizing communications activity, according to some embodiments.

FIG. 5 illustrates an exemplary user interface 500, consistent with an embodiment of the present disclosure. User interface 500 illustrates an example of a display generated by the computing device (e.g., computing device 110) that can be implemented on device (e.g., display 112) for viewing by a user. Interface 500 can assist the user to visualize information regarding communications and relationships between the primary individual and other individuals. In the exemplary embodiment of FIG. 5, interface 500 includes user names 510, connections 520, and filters 530. Each of these graphical elements is described in greater detail below. It will be understood from this disclosure that the number and arrangement of these elements is exemplary and that modifications can be made, consistent with the present disclosure.

User names 510 may include the names of other individuals associated with the primary individual. For example, user names 510 may include the names of other individuals with whom the primary individual has a relationship or has exchanged communications. In one embodiment, interface 500 may display user names of the other individuals with whom the primary individual has the strongest association (i.e., the user's "Top Contacts") in order of strength of association (i.e., rank). Connections 520 indicate the connections, such as the relationships and communications, that exist between the primary individual and each other individual listed in interface 500. For example, connections 520 may indicate the number of times the primary individual has mentioned or been mentioned by each of the primary individual's top contacts, as well as the number of direct messages exchanged between the primary individual and each of the primary individual's top contacts.

Filters 530 may be used to filter the list of individuals displayed in interface 500 according to one or more tags or categories. In one embodiment, one or more filters 530 are displayed along with checkboxes. In response to a selection of one or more checkboxes by an analyst, the computing device may filter the displayed contacts to include only information associated with the contacts that match the selected filters. In the exemplary embodiment shown in FIG. 5, filters 530 include school, work, family, and other. Accordingly, an analyst may filter the list of individuals displayed in interface 500 to show only the primary individual's school and work contacts by selecting the school and work filters.

Figure 6:
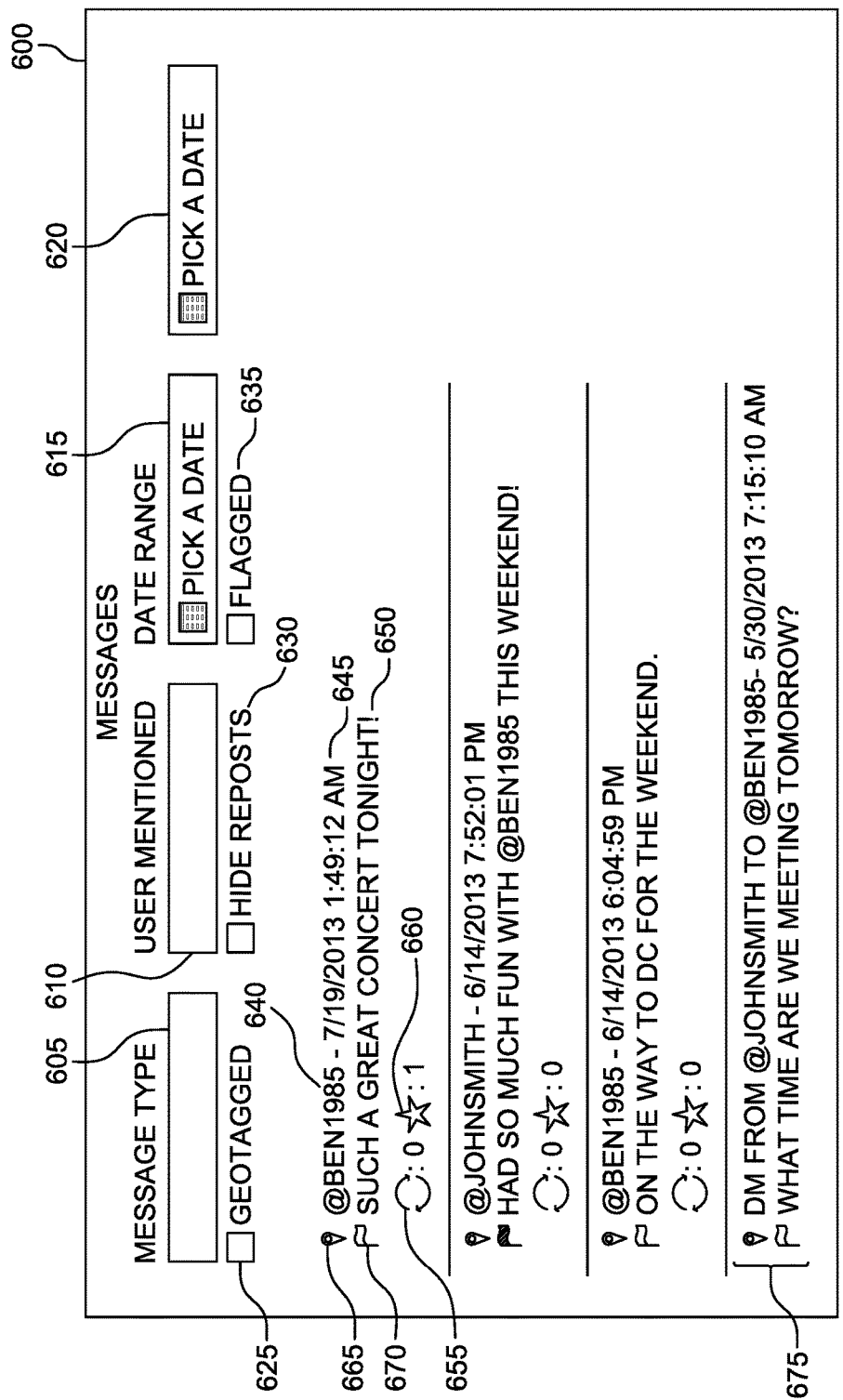
FIG. 6 illustrates a third example user interface for visualizing communications activity, according to some embodiments.

FIG. 6 illustrates an exemplary user interface 600, consistent with an embodiment of the present disclosure. User interface 600 illustrates an example of a display generated by the computing device (e.g., computing device 110) that can be implemented on device (e.g., display 112) for viewing by a user. Interface 600 can assist the user to visualize communications associated with the primary individual. In the exemplary embodiment of FIG. 6, interface 600 includes communication type filter 605, user mentioned filter 610, start date 615, end date 620, geotag filter 625, repost filter 630, flagged filter 635, user name 640, timestamp 645, content 650, repost count 655, like count 660, geotag indicator 665, flag indicator 670, and private communication 675. Each of these graphical elements is described in greater detail below. It will be understood from this disclosure that the number and arrangement of these elements is exemplary and that modifications can be made, consistent with the present disclosure.

Communication type filter 605 may enable an analyst to select one or more communication types for display in interface 600. For example, an analyst may input or select direct messages or tweets using communication type filter 605, such that interface 600 displays only direct messages or only tweets. If no message types are entered in communication type filter 605, interface 600 may display all communications associated with the primary individual. User mentioned filter 610 may enable an analyst to select one or more other individuals, such that only communications mentioning those individuals are displayed in interface 600. In one embodiment, the computing device may display communications that are sent to or received from an individual included in user mentioned filter 610. In another embodiment, the computing device may display communications that include an individual listed in user mentioned filter 610 in the content of text of the communication. Start date 615 and end date 620 may enable an analyst to select start and end dates of a date range for filtering the communications. Accordingly, the computing device can display only those communications occurring within the specified date range.

Geotag filter 625, repost filter 630, and flagged filter 635 each may be associated with checkboxes to enable an analyst to select one or more of these filters. Geotag filter 625 may be selected to display only those communications that have been geotagged, either by the individual who authored the communication, automatically by the computing device (e.g., by analyzing text or images associated with the communication), or manually by an analyst. Repost filter 630 may be selected to hide repostings of a communication, such as retweets on Twitter or posts shared by someone other than the original author on Facebook. Flagged filter 635 may be selected to display only those communications that have been flagged (e.g., during prior review of the communication by an analyst).

Each of the displayed communications may include one or more of components 640-670. User name 640 may be the user name or account name of the individual who authored the communication. Timestamp 645 may indicate the date and time at which the communication was sent. Content 650 may include the content of the communication, which may include text, images, or other media. Repost count 655 may indicate the number of times the communication has been reposted by any individual. Like count 660 may indicate the number of times the communication has been liked or favorited by any individual. Geotag indicator 665 may indicate that the communication is associated with a geotag. In one embodiment, selection of geotag indicator 665 may display a popup or other interface that presents information regarding one or more locations associated with the communication. Flag indicator 670 may indicate that the communication has been flagged. In one embodiment, selection of flag indicator 670 may display a popup or other interface that presents information that explains why the communication was flagged, including the source of the flag (e.g. automatic, analyst name) and reason for the flag. Private communication 675 is an exemplary private message, which may, like public communications (e.g., tweets) include one or more of components 640-670.

FIG. 7 illustrates an exemplary user interface 700, consistent with an embodiment of the present disclosure. User interface 700 illustrates an example of a display generated by the computing device (e.g., computing device 110) that can be implemented on device (e.g., display 112) for viewing by a user. Interface 700 can assist the user to visualize information regarding user groups. In the exemplary embodiment of FIG. 5, interface 500 includes group name 710, user count 720, group member table 730, user name 740, date of update 750, country 760, map 770, and contact list 780. Each of these graphical elements is described in greater detail below. It will be understood from this disclosure that the number and arrangement of these elements is exemplary and that modifications can be made, consistent with the present disclosure.

Group name 710 may include the name of the group whose information is displayed in interface 700. User count 720 may indicate the number of individuals who are assigned to the group. Group member table 730 may list each of the individuals who belong to the group. User name 740 may specify a user account that has been assigned to the group. Date of update 750 may indicate the last date on which information associated with a user account was updated. Country 760 may indicate one or more countries associated with a user account. Map 770 may display one or more locations associated with individuals assigned to the group. In one embodiment, contact list 780 displays information regarding the top contacts of the individuals assigned to the group. In another embodiment, contact list 780 displays the most active members of the group and their connections to other members. The information displayed in contact list 780 may be similar to the information displayed in interface 500 and include similar components (e.g., user names 510, connections 520, and filters 530).

Oftentimes, marketing campaigns, sentiment analysis campaigns, and the like focus on large groups of people, for example, all of the members of a certain class of people (e.g., 18-24 year olds in the San Francisco Bay Area or members of a college chess club). The membership of the group of people being studied and each person's role therein may not be known. However, the researcher may have access to profile data (e.g., email messages, social network private messages, social network posts, geographic location data, etc.) for some of the members who may have voluntarily contributed their data. The profile data of other members may also be desirable to the researcher. However, the researcher may not have access to such data, for example, due to a lack of knowledge of who the other members are or due to the other members not participating in the study.

In accordance with some implementations of the subject technology, a machine of an researcher receives profile data of Person-A. The profile data of Person-A is received, for example, in response to a request for data from Person-A (who may be compensated for providing such data) and includes one or more of: instant messages, text messages, email messages, social network private messages, and social network posts. The profile data of Person-A may be received from a social network, an instant message service provider, an email provider, a cellular phone company, and the like. Person-A is known or suspected, by the researcher, to be associated with a group of people being targeted by a marketing or sentiment analysis campaign. The machine stores the profile data of Person-A in a data repository storing profiles for use in one or more studies.

The machine scans and processes (e.g., using optical character recognition and machine learning techniques) the profile data and stores a local profile for Person-A. The machine determines a set of information items from the profile data of Person-A that is associated with activity related to the marketing or sentiment analysis campaign of Person-A. For example, the machine may include communications about planned activities related to the marketing or sentiment analysis campaign in the set of information items. For example, if the machine is determining sentiment applied towards a politician, the machine may include communications discussing the politician (e.g., communications provided to members of a politics club). The machine may exclude communications between Person-A and his/her spouse about child care or grocery purchases from the set of information items.

The machine determines that that the set of information items associated with the marketing or sentiment analysis activity includes a subset of information items associated with Person-B. For example, Person-A and Person-B may have communicated about a political candidate who is the subject of a sentiment analysis or a product that is the subject of a marketing campaign and the information items corresponding to communications between Person-A and Person-B related to the political candidate or the product may be placed in the subset.

If the data repository lacks a profile for Person-B, the machine creates, in the data repository, a profile for Person-B based on the subset of information items. If the data repository already has a profile for Person-B, the machine adds the subset of information items to the profile for Person-B.

In some aspects, the subject technology allows a researcher to gather profile data about Person-B without querying the social networking service for the profile data of Person-B. Using these aspects, the researcher can learn, prior to requesting (e.g., from Person-B and in exchange for compensation provided to Person-B) to access Person-B's information for Person-B, that Person-B is involved in sentiment analysis or marketing-related activity and an estimated level of Person-B's involvement (e.g., based on the number and the content of the information items in the subset). Based on this information, the researcher may take steps (e.g., reach out to Person-B) to obtain further information about Person-B. The subject technology may be implemented in multiple different contexts, for example, marketing, sentiment analysis, gathering information about a person (e.g., a potential new employee, contractor or friend), law enforcement, intelligence, and the like.

Figure 8:
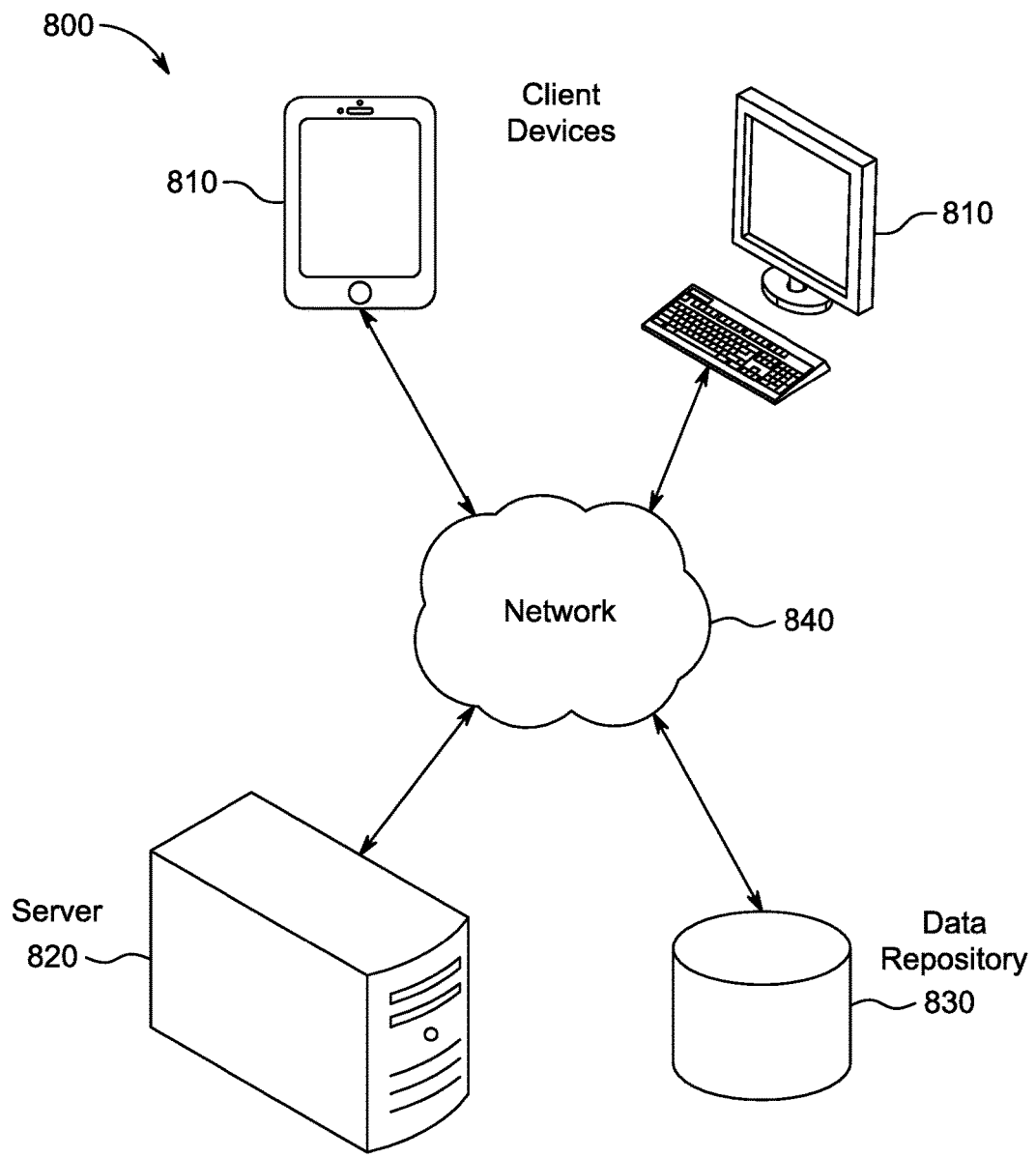
FIG. 8 illustrates an example system in which building a user profile data repository may be implemented, according to some embodiments.

FIG. 8 illustrates an example system 800 in which embodiments of building a user profile data repository may be implemented. As shown, the system 800 includes client devices 810, a server 820, and a data repository 830 connected to one another via a network 840. The network 840 may include one or more of an Internet, an intranet, a local area network (LAN), a wide area network (WAN), a cellular network, a WiFi network, an Ethernet network, a virtual private network (VPN) and the like. Each of the client devices 810, the server 820, and the data repository 830 may include some or all of the components of the system 100.

The server 820 may include a single server, multiple servers, or a server farm. The server 820 includes processor(s) and a memory. According to some implementations, the server 820 accesses, from the data repository 830, profile data of a first entity (e.g., a person or a business). The server 820 determines that a set of information items from the accessed profile data of the first entity are associated with a target activity. The server 820 determines that the set of information items associated with the target activity includes a subset of information items associated with a second entity. The server 820 creates or edits, within the data repository 830, profile data of the second entity based on the subset of information items. The server 820 provides, to one or more client devices 810, a digital transmission of at least a portion of the profile data of the second entity.

The data repository 830 stores data or instructions. For example, the data repository 830 may store profiles of entities that are provided to the server 820 (e.g., by a person accessing a public view of a social networking service or in response to a legal process request). As shown, the data repository 830 is connected to the network 840 and accessible to the server 820 via the network 840. In alternative embodiments, the data repository 830 may not be connected to the network 840 and may instead be directly coupled with the server 820.

The client devices 810 may include one or more of a mobile phone, a tablet computer, a smart watch, a personal digital assistant (PDA), a laptop computer, a desktop computer, and the like. In some cases, the server 820 provides data for display at one of the client devices 810 and receives user input from that client device 810. Alternatively, the functions of the server 820 described herein may be implemented completely at the client device 810. Data may be stored in a local memory of the client device 810 or in the data repository 830 accessible to the client device via the network 840.

Figure 9:
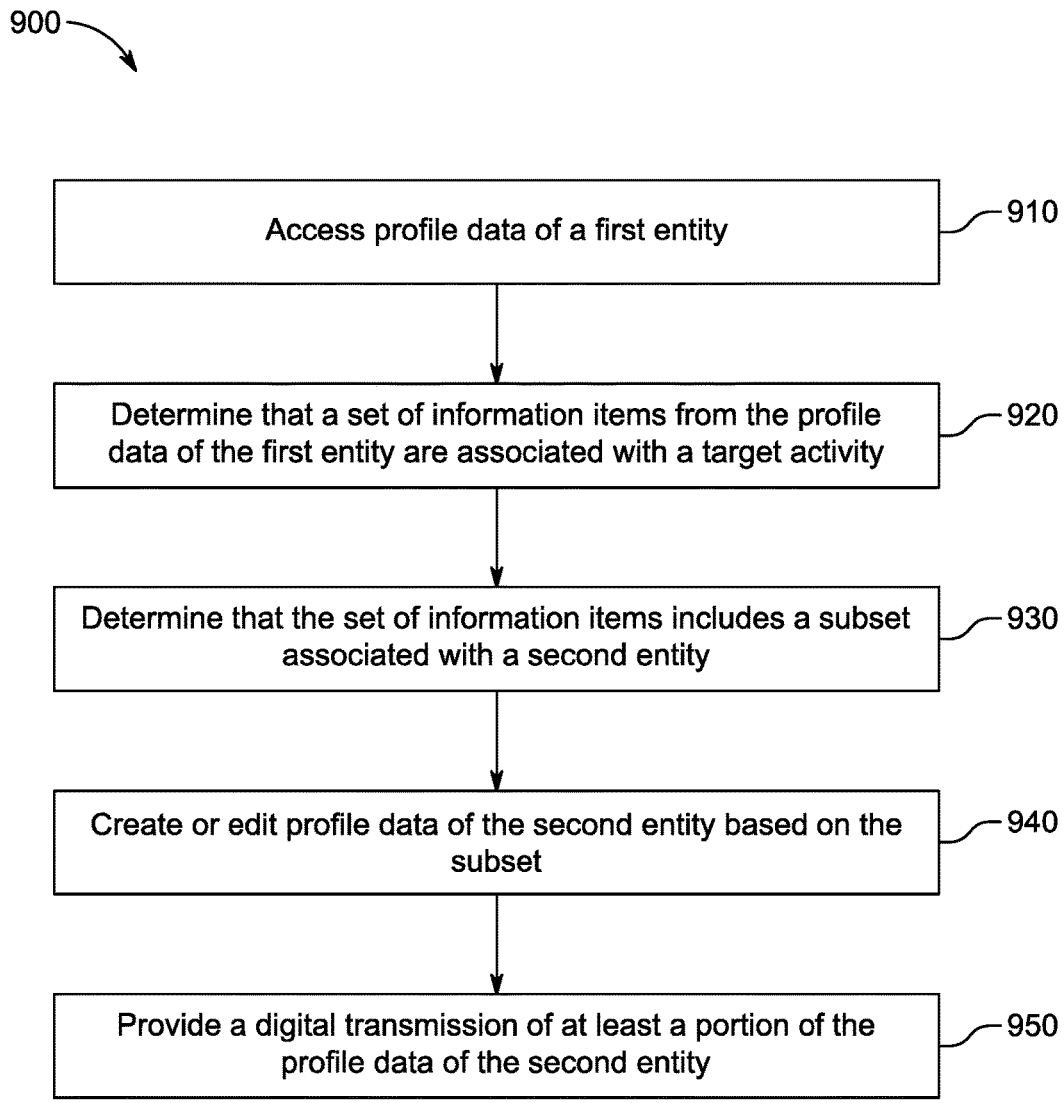
FIG. 9 is a flow chart illustrating an example method for analyzing electronic communications to build a user profile data repository, according to some embodiments.

FIG. 9 is a flow chart illustrating an example method 900 for analyzing electronic communications for analyzing electronic communications to build a user profile data repository. The method 900 may be implemented at the server 820 or at another computing device (e.g., system 100) in place of the server 820.

The method 900 begins at operation 910, where the server 820 accesses, from the data repository 830, profile data of a first entity (e.g., a person or a business). The profile data of the first entity was previously provided to the data repository 830, for example, in response to a legal process request or via a public view of a social networking service.

At operation 920, the server 820 determines that a set of information items from the accessed profile data of the first entity are associated with a target activity. The set of information items may include instant messages, text messages, email messages, social network private messages, social network posts, and the like. The target activity may be any activity, for example, drafting patent applications or riding a bike. The set of information items associated with the target activity may be identified via machine learning.

In some cases, the set of information items is identified by searching for words or phrases that are associated with the target activity. For example, if the target activity is drafting patent applications, the words or phrases may include "patent," "application," "draft," "specification," "claims," "drawings," "figures," and the like. In some examples, the server 820 accesses a stored (e.g., locally at the server 820 or in the data repository 830) collection of words and phrases associated with the target activity. The server 820 determines that at least a threshold number of words and phrases associated with the target activity appear within the set of information items or within each item or combination (e.g., thread) of items within the set of information items.

In some cases, the set of information items is identified by the server 820 accessing a stored (e.g., in a local memory of the server 820 or in the data repository 830) collection of geographic location/timestamp tuples associated with the target activity, where the target activity was carried out. For example, if the target activity is little league baseball, the geographic location/timestamp tuples where little league baseball games or practices occurred. For example, a little league practice occurred at Golden Gate Park in San Francisco at 3 PM on May 1, 2016 the geographic location/ timestamp tuple would be <Golden Gate Park/3 PM on May 1, 2016>. The server determines that, for at least a threshold number of the geographic location/timestamp tuples, the first entity (and, in some cases, also the second entity) was within a threshold distance (e.g., 100 meters, 1 kilometer, or 10 kilometers) of the geographic location in the tuple at a moment within a threshold time period (e.g., 1 hour or 1 day) from the timestamp in the tuple.

In some implementations, the server 820 determines that the first entity (and, in some cases, also the second entity) was within the threshold distance of the geographic location in the tuple by accessing an image including the first entity (e.g., that was taken or posted within the threshold time period from the timestamp in the tuple). If the image has a geographic tag, the geographic tag is used to determine the geographic location of the first entity and the image. If the image lacks a geographic tag, the geographic location of the first entity and the image is determined based on visual information in the image. For example, if the image includes a Bay Area Rapid Transit (BART) train, the server 820 determines that the image is located in the San Francisco Bay Area. If the image includes the Embarcadero BART Station (or a sign naming the Embarcadero BART Station), the server 820 determines that the image is located near the Embarcadero BART station.

At operation 930, the server 820 determines that the set of information items associated with the target activity includes a subset of information items associated with a second entity (e.g., a person or a business different from the first entity). The subset of information items associated with the second entity includes communications sent to the second entity or received from the second entity. The subset of information items may include any information items that feature the second entity (e.g., the second entity being tagged or mentioned in a social networking post).

The operations 920 and 930 are combined in order to access information about other entities (e.g., the second entity) that participate in the target activity together with the first entity. For example, if the target activity is drafting patent applications, a patent attorney may discuss the drafting of the patent applications with clients and may discuss grocery shopping with his/her spouse. The operation 920 is used to filter out the communications about grocery shopping with the spouse, and the operation 930 is used to identify the clients with which the drafting of the patent applications is discussed.

At operation 940, the server 820 creates or edits, within the data repository 830, profile data of the second entity based on the subset of information items. For example, the server 820 stores the subset of information items within the profile data of the second entity in the data repository 830.

At operation 950, the server 820 provides a digital transmission of at least a portion of the profile data of the second entity to one or more client devices 810. The digital transmission may cause data to be displayed at the client device 810 and may be a browser-based transmission, an email transmission, a mobile phone push notification, a short messaging service (SMS) or multimedia messaging service (MMS) transmission, and the like.

The subject technology could be used in multiple different contexts. The subject technology could be used, for example, by a person who has a crush on another person who is two degrees of separation from him/herself (i.e., a "friend of a friend") to gather information about the crush based on the posts of the first degree connections (i.e., friends) that include the crush. In these embodiments, the target activity may be a hobby (e.g., tennis, visiting museums, antiquing, and the like) in which both the person and the crush are interested.

Embodiments of the present disclosure have been described herein with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as exemplary only, with a true scope and spirit of the present disclosure being indicated by the following claims. It is also intended that the sequence of operations shown in figures are only for illustrative purposes and are not intended to be limited to any particular sequence of operations. As such, it is appreciated that these operations can be performed in a different order while implementing the exemplary methods or processes disclosed herein.

What is claimed is:

1. A system comprising:
   one or more processors; and
   a memory storing instructions that, when executed by the one or more processors, cause the one or more processors to implement operations comprising:
   accessing, from a data repository, profile data of a first entity;
   determining, in a first determining operation, that a set of information items from the accessed profile data of the first entity are associated with a target activity, wherein the set of information items comprises a set of geographic location/timestamp tuples associated with the target activity, wherein determining that the set of information items from the accessed profile data of the first entity are associated with the target activity comprises:
   accessing a stored collection of geographic location/timestamp tuples associated with the target activity; and
   determining that, for at least a threshold number of the geographic location/timestamp tuples, the first entity was within a threshold distance of the geographic location in a tuple at a moment within a threshold time period from the timestamp in the tuple;
   determining, in a second determining operation, that the set of information items associated with the target activity includes a subset of information items associated with a second entity;
   creating or editing, within the data repository, profile data of the second entity based on the subset of information items in response to a determination, in the second determining operation, that the second entity is associated with the target activity; and
   providing a digital transmission of at least a portion of the profile data of the second entity, wherein the digital transmission comprises a map of geographic locations associated with geographic location/timestamp tuples from the subset of information items associated with the second entity.

2. The system of claim 1, wherein the set of information items comprises one or more of: instant messages, text messages, email messages, social network private messages, and social network posts.

3. The system of claim 1, wherein the subset of information items associated with the second entity comprises communications sent to the second entity or received from the second entity.

4. The system of claim 1, wherein determining that the set of information items from the accessed profile data of the first entity are associated with the target activity comprises:
    accessing a stored collection of words or phrases associated with the target activity; and
    determining that at least a threshold number of words or phrases associated with the target activity appear within the set of information items.

5. The system of claim 1, wherein the geographic location/timestamp tuples associated with the target activity comprise geographic locations and timestamps where the target activity was carried out.

6. The system of claim 1, wherein determining that the first entity was within the threshold distance of the geographic location of the tuple comprises:
    accessing an image including the first entity, wherein the image lacks a geographic tag; and
    determining, based on visual information in the image, a geographic location of the image.

7. A non-transitory machine-readable medium storing instructions that, when executed by one or more processors of a machine, cause the one or more processors to implement operations comprising:
    accessing, from a data repository, profile data of a first entity;
    determining, in a first determining operation, that a set of information items from the accessed profile data of the first entity are associated with a target activity, wherein the set of information items comprises a set of geographic location/timestamp tuples associated with the target activity, wherein determining that the set of information items from the accessed profile data of the first entity are associated with the target activity comprises:
        accessing a stored collection of geographic location/timestamp tuples associated with the target activity; and
        determining that, for at least a threshold number of the geographic location/timestamp tuples, the first entity was within a threshold distance of the geographic location in a tuple at a moment within a threshold time period from the timestamp in the tuple;
    determining, in a second determining operation, that the set of information items associated with the target activity includes a subset of information items associated with a second entity;
    creating or editing, within the data repository, profile data of the second entity based on the subset of information items in response to a determination, in the second determining operation, that the second entity is associated with the target activity; and
    providing a digital transmission of at least a portion of the profile data of the second entity, wherein the digital transmission comprises a map of geographic locations associated with geographic location/timestamp tuples from the subset of information items associated with the second entity.

8. The non-transitory machine-readable medium of claim 7, wherein the set of information items comprises one or more of: instant messages, text messages, email messages, social network private messages, and social network posts.

9. The non-transitory machine-readable medium of claim 7, wherein the subset of information items associated with the second entity comprises communications sent to the second entity or received from the second entity.

10. The non-transitory machine-readable medium of claim 7, wherein determining that the set of information items from the accessed profile data of the first entity are associated with the target activity comprises:
    accessing a stored collection of words or phrases associated with the target activity; and
    determining that at least a threshold number of words or phrases associated with the target activity appear within the set of information items.

11. The non-transitory machine-readable medium of claim 7, wherein the geographic location/timestamp tuples associated with the target activity comprise geographic locations and timestamps where the target activity was carried out.

12. The non-transitory machine-readable medium of claim 7, wherein determining that the first entity was within the threshold distance of the geographic location of the tuple comprises:
    accessing an image including the first entity, wherein the image lacks a geographic tag; and
    determining, based on visual information in the image, a geographic location of the image.

13. A method comprising:
    accessing, from a data repository, profile data of a first entity;
    determining, in a first determining operation, that a set of information items from the accessed profile data of the first entity are associated with a target activity, wherein the set of information items comprises a set of geographic location/timestamp tuples associated with the target activity, wherein determining that the set of information items from the accessed profile data of the first entity are associated with the target activity comprises:
        accessing a stored collection of geographic location/timestamp tuples associated with the target activity; and
        determining that, for at least a threshold number of the geographic location/timestamp tuples, the first entity was within a threshold distance of the geographic location in a tuple at a moment within a threshold time period from the timestamp in the tuple;
    determining, in a second determining operation, that the set of information items associated with the target activity includes a subset of information items associated with a second entity;
    creating or editing, within the data repository, profile data of the second entity based on the subset of information items in response to a determination, in the second determining operation, that the second entity is associated with the target activity; and
    providing a digital transmission of at least a portion of the profile data of the second entity, wherein the digital transmission comprises a map of geographic locations associated with geographic location/timestamp tuples from the subset of information items associated with the second entity.

14. The method of claim 13, wherein the subset of information items associated with the second entity comprises communications sent to the second entity or received from the second entity.

15. The method of claim 13, wherein determining that the set of information items from the accessed profile data of the first entity are associated with the target activity comprises:
    accessing a stored collection of words or phrases associated with the target activity; and
    determining that at least a threshold number of words or phrases associated with the target activity appear within the set of information items.

16. The method of claim 13, wherein the geographic location/timestamp tuples associated with the target activity comprise geographic locations and timestamps where the target activity was carried out.

* * * * *